US012620242B2

(12) United States Patent
George et al.

(10) Patent No.: US 12,620,242 B2
(45) Date of Patent: May 5, 2026

(54) SYSTEMS AND METHODS FOR PRINTED CIRCUIT BOARD NETLIST EXTRACTION FROM MULTIMODAL IMAGERY

(71) Applicant: Battelle Memorial Institute, Columbus, OH (US)

(72) Inventors: Anthony F. George, Columbus, OH (US); John Timothy Balint, Westerville, OH (US); Thomas Kent, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 260 days.

(21) Appl. No.: 18/493,895

(22) Filed: Oct. 25, 2023

(65) Prior Publication Data

US 2024/0135732 A1    Apr. 25, 2024
US 2024/0233407 A9    Jul. 11, 2024

Related U.S. Application Data

(60) Provisional application No. 63/380,804, filed on Oct. 25, 2022.

(51) Int. Cl.
*G06V 20/60*        (2022.01)
*G06V 10/82*        (2022.01)

(52) U.S. Cl.
CPC .............. *G06V 20/60* (2022.01); *G06V 10/82* (2022.01)

(58) Field of Classification Search
CPC ............................... G06V 20/60; G06V 10/82
See application file for complete search history.

(56) References Cited

U.S. PATENT DOCUMENTS

| | | | | |
|---|---|---|---|---|
| 11,531,197 | B1 * | 12/2022 | Grisleri ............... | H04N 23/682 |
| 11,803,955 | B1 * | 10/2023 | Pandya ............... | G08B 29/186 |
| 2013/0011042 | A1 * | 1/2013 | Satish ........................ | G06T 5/00 382/134 |
| 2020/0340901 | A1 * | 10/2020 | Ozcan ............... | G01N 15/0227 |
| 2021/0082101 | A1 | 3/2021 | Kent et al. | |
| 2021/0256683 | A1 * | 8/2021 | Asadi-Zanjani ........ | G06T 7/254 |
| 2021/0304002 | A1 * | 9/2021 | George ............... | G06F 21/562 |
| 2022/0020114 | A1 | 1/2022 | George et al. | |
| 2022/0237904 | A1 * | 7/2022 | Al-Maadeed ............ | G06T 7/73 |
| 2023/0091313 | A1 * | 3/2023 | Wu ........................ | G06T 7/593 345/419 |
| 2023/0125477 | A1 * | 4/2023 | Gurumurthy ........... | G06N 3/08 382/103 |

OTHER PUBLICATIONS

Balint, et al., "Towards PCB Netlist Extraction from Multimodal Imagery", IEEE Physical Assurance and Inspection of Electronics (PAINE) Conference Paper, Oct. 25-27, 2022, 7 pages.

(Continued)

*Primary Examiner* — Qun Shen
(74) *Attorney, Agent, or Firm* — Secant IP, P.L.L.C.; Donald G. Weiss

(57) ABSTRACT

A system and method for generating a netlist for a printed circuit board. In some embodiments, the method includes capturing image data of a circuit board from a plurality of sensors to generate a set of captured data for each of the plurality of sensors; extracting a plurality of features from the image data using machine learning; and generating a design associated with the circuit board from the plurality of features.

18 Claims, 10 Drawing Sheets

(56) References Cited

OTHER PUBLICATIONS

International Search and Written Opinion Report from correspond-
ing PCT Appln. No. PCT/US23/77705, dated Mar. 8, 2024. 9 pages.
Botero, et al., "Hardware Trust and Assurance through Reverse
Engineering: A Tutorial and Outlook from Image Analysis and
Machine Learning Perspectives", ACM Journal on Emerging Tech-
nologies in Computing Systems, vol. 17, No. 4, Article 62, Jun.
2021, pp. 1-53.
Lian, et al., "Automatic Visual Inspection for Printed Circuit Board
via Novel Mask R-CNN in Smart City Applications", Sustainable
Energy Technologies and Assessments, vol. 44, Apr. 2021, pp. 1-19.

* cited by examiner $$L_{edge} = \frac{\sum_{x=1}^{W} \sum_{y=1}^{H} (E_{ij} + (|P_{ij} - G_{ij}|))}{\|G\|}$$

*Includes a manual error-checking step to verify output generated the neural network.

SYSTEMS AND METHODS FOR PRINTED CIRCUIT BOARD NETLIST EXTRACTION FROM MULTIMODAL IMAGERY

CROSS-REFERENCE TO RELATED APPLICATIONS

The present application claims the benefit of the filing date of U.S. Provisional Application Ser. No. 63/380,804, filed Oct. 25, 2022, the entire teachings of which application is hereby incorporated herein by reference.

TECHNICAL FIELD

The present application relates generally to systems and methods for printed circuit board netlist extraction from multimodal imagery.

BACKGROUND

Electronic Commercial Off-The-Shelf (COTS) items are packaged electronic components that are used in custom systems. Usually, an electronic COTS item comprises a printed circuit board (PCB) with various integrated circuits (ICs) and discrete components mounted on the PCB and electrically interconnected by printed circuitry of the PCB. For example, a military air force or civilian airline may use a COTS item as an aircraft component. In many cases, the customer (e.g., air force or airline) will qualify a COTS item for use in a particular system (e.g., a particular model/make aircraft) based on component specifications and/or extensive testing to ensure the COTS item meets stringent performance and reliability criteria. For example, an air force may require all ICs in a COTS item to be "military grade", for example having an operational temperature range meeting some required standard. It is often critical to have a high level of confidence that COTS items meet design and performance specifications prior to their deployment.

The outsourcing implicit in using a COTS item means that the customer does not control the manufacturing/supply chain producing the COTS item, making it extremely difficult to track component and assembly provenance. For example, the manufacturer may make an undocumented revision to the COTS item that may potentially affect the customer. Another concern with employing COTS items in a system is that there is the potential to receive a counterfeit COTS item, which may have substitute (possibly lower quality) parts or may introduce privacy-compromising capabilities or other issues. Another concern with employing COTS items is that the COTS item may not meet performance specifications provided by the supplier. This can occur due to use of lower performing counterfeit parts, use of manufacturing parameters that do not meet performance specifications, failure to provide proper connectivity between components, and so forth.

These types of concerns can be alleviated by testing of COTS items. In destructive analysis approaches, the COTS item is disassembled or otherwise destructively analyzed to assure it meets the requisite specifications. Naturally, destructive analysis can only be performed on "extra" COTS items delivered to the customer, which increases cost at the customer end. Furthermore, destructive analysis cannot provide assurance that a particular COTS item that is actually installed in a customer system meets specifications. Nondestructive analysis (NDA) overcomes these deficiencies. However, existing NDA techniques do not accurately and efficiently capture the connectivity of the PCB components to one another. This makes it difficult to confirm a COTS item meets design specifications or to determine the design of a PCB when a COTS manufacturer does not provide design information to the end user.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
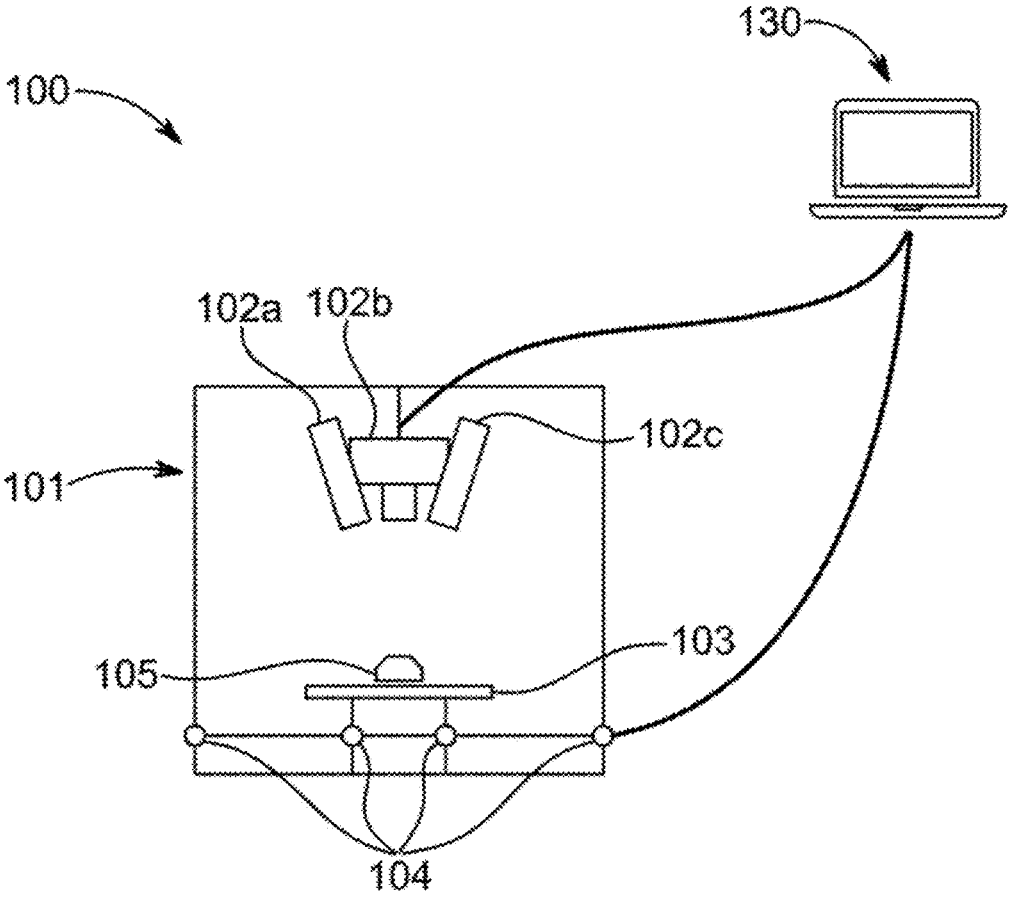
FIG. 1 diagrammatically illustrates one example of a multimodal inspection system (MIS) consistent with the present disclosure.

While a number of NDA solutions exist to locate the components on a PCB, there is still a need for solutions to accurately and efficiently extract the connectivity of these components in a standard format, such as netlist. As used herein a "netlist" is a human and/or computer readable representation of a functional circuit that identifies connections between the circuit component pins and traces. In general, generating a netlist may involve determining the components and pins on a PCB, identifying the connections between components, and connecting the components together using the found copper connections.

A system and method consistent with the present disclosure may generate design information, including a netlist, for a PCB. The netlist may be compared, simulated, and tested to determine if any anomalies are present in the PCB and if the assembly is safe for installation. This may be accomplished while maintaining throughput scaling, efficiency and high accuracy feature extraction, component identification, and connectivity tracing.

There are several challenges to extracting a netlist from a PCB. For example, functional and decorative text (i.e., the silkscreen) can be overlaid on copper connections, making it difficult for a machine to properly differentiate between the board and surface trace. Also, large components such as ICs may occlude pin connections.

To overcome these challenges and generate an accurate netlist, a system consistent with the present disclosure may employ a multimodal inspection system (MIS). The MIS may use one or more modalities to inspect a sample. Multimodal image analysis uses a combination of different electromagnetic wavelengths, such as infrared and ultraviolet radiation, in order to analyze aspects of an image not readily visible or occluded on a traditional RGB image. Some of the modalities include, but are not limited to Raman, visible (VIS), terahertz (THz) spectroscopy, long-wave infrared (LWIR), shortwave infrared (SWIR), laser profilometry (LP), electromagnetic interference (EMI) near field probing, and/or, Millimeter Wave (MMW) radar. Copper layer regions and component mounting point locations may be extracted from multiple surface imagery modalities in the MIS to facilitate netlist extraction for a PCB.

In some embodiments, MIS image captures from multiple modalities may be provided as inputs to a machine learning algorithm, for example, a deep-learning image-based segmentation model, to predict the PCB components, their mounting points, and copper portions on the top and bottom of the board. In some embodiments, the model may use six or more different image capture modalities from the MIS. Also disclosed herein is a performance metric that accurately reflects the correctness of extracted copper layers in an inspection system such as an MIS.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The systems and methods described herein may be applicable to a number of use cases, such as electronic device NDA, electronic device quality assurance, electronic device counterfeiting detection, and the like. In one or more examples discussed herein, a sample may be a COTS PCB, however, this is meant for illustrative purposes only and the techniques described herein may be applied to any sample item, commercial or otherwise.

FIG. 1 illustrates an example MIS 100 from a front-side-view perspective. MIS 100 may be implemented with a mechanical scanning gantry 101 that provides the structure and frame for other components, such as one or more sensors 102 (e.g., 102a, 102b, 102c) for multiple modalities fixed above a translation stage 103. Sensors 102 may be pointed towards stage 103. At least one sensor 102 may be a sensor 102b (e.g., camera) that is aimed normal to the stage 103, and sensors 102a and 102c may be aimed at an angle. Stepper motors 104 may be attached to mechanical scanning gantry 101, and stage 103 may be attached to mechanical scanning gantry 101 via stepper motors 104. Stepper motors 104 may enable x, y, and/or z translation of stage 103 allowing control of the position of sample 105 with a high degree of accuracy (e.g., 12.5 μm of better). Stepper motors 104 may have both coarse and fine motor control.

Sample 105 may be removably attached to stage 103 allowing sample 105 to remain stationary as stage 103 is moved. This configuration may enable sensors 102 to remain stationary as stage 103, and fixed sample 105 (e.g., PCB), moves freely in one or more axes. In one example, stage 103 may be configured to laterally translate sample 105 relative to the plane of sample 105, such as the plane of a PCB. Sensors 102 and stepper motors 104 may be operatively connected to a computing device 130. Computing device 130 may be hard wired or connected wirelessly and may be local or remote to scanning gantry 101 and attached components.

While not shown in FIG. 1, there may be one or more power supplies that may provide power to sensors 102, stepper motors 104, computing device 130, and/or sample 105 (e.g., for testing purposes such as for testing with sample 105 powered).

Figure 2:
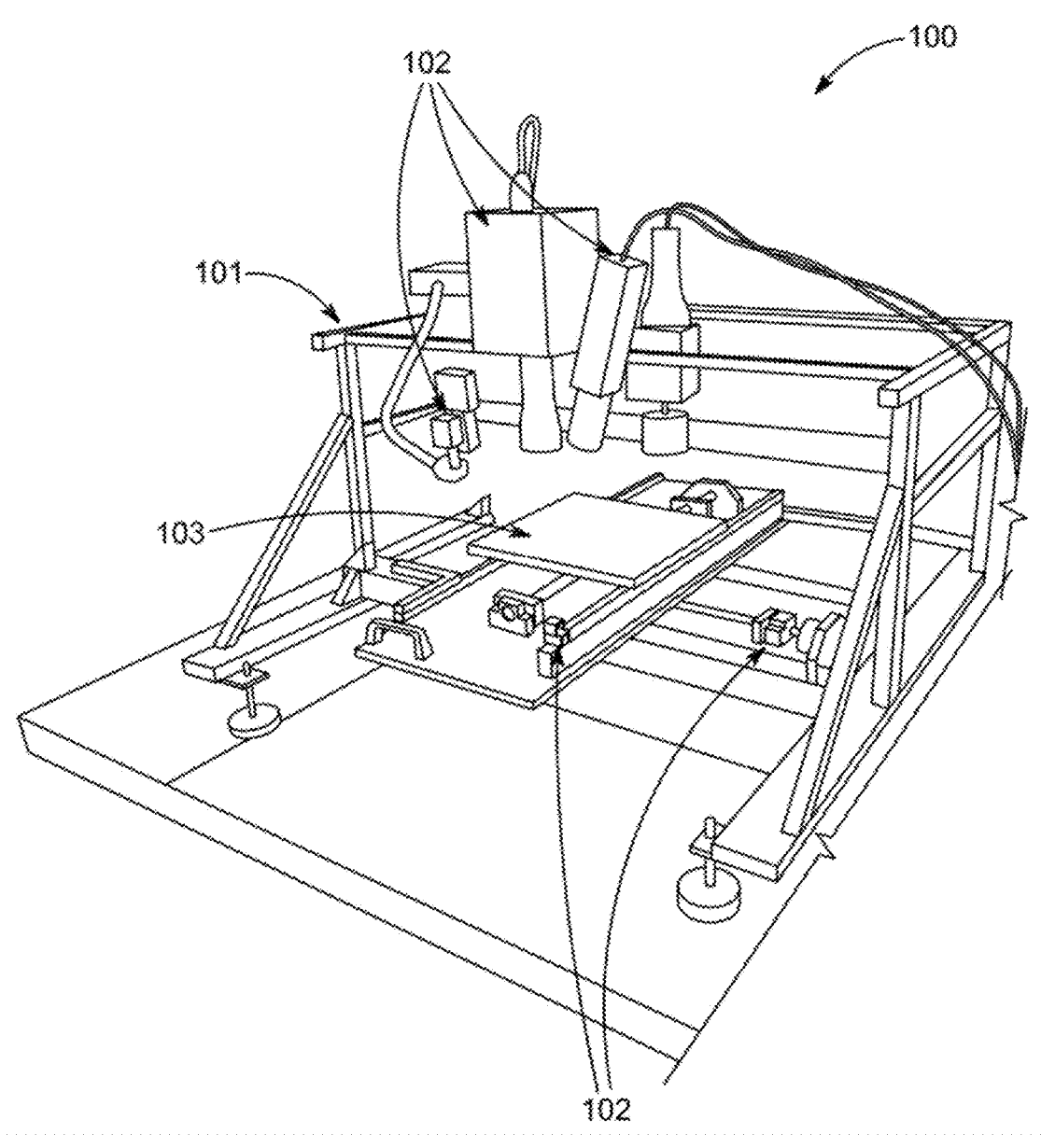
FIG. 2 illustrates an example MIS consistent with the present disclosure from a front-side-view perspective.

FIG. 2 illustrates an image of an example MIS 100. Mechanical scanning gantry 101 provides the structure and frame for other components, such as one or more sensors 102 for multiple modalities fixed above a translation stage 103. Sensors 102 are pointed towards stage 103.

In one embodiment, scanning gantry 101 may be enclosed and sealed to the outside environment. Within scanning gantry 101 there may be one or more lights to illuminate sample 105. Scanning gantry 101 may also have inlet/outlets for conditioned air to control the temperature and humidity levels within the enclosure. Scanning gantry 101 may provide RF shielding so as to further insulate sensors 102 from interference, such as electrical interference, for example. The shielding may enable MIS 100 to control environmental factors such as interference, illumination, ambient temperature, and relative humidity. In some cases, these parameters may affect sensor results and calibration settings including optical focus and exposure time. Controlling such parameters may enable high repeatability in measurements for all modalities as well as lead to more accurate results.

In another example, scanning gantry 101 may be open, and the parameters may be controlled in an external environment (e.g., room) of scanning gantry 101. In either configuration, enclosed or open scanning gantry 101, the environmental parameters may be recorded as part of the data capture process.

While FIG. 1 and FIG. 2 illustrate examples of MIS 100, other arrangements for MIS 100 may be employed. For example, stage 103 may be replaced by a stationary stage, and sensors 102 for a variety of modalities, each configured to move independent of the stationary table to acquire data regarding the sample. For example, one or more sensors 102 may each be attached to a single movable rig with stepper motors, or each sensor 102 may have its own set of stepper motors to facilitate movement. Additionally, or alternatively, stage 103 may be replaced by another type of support, such as a frame, that holds sample 105 by its peripheral edges allowing unobstructed views of both sides of sample 105 by the equipment of MIS 100.

In one example, sample 105 may comprise a PCB, or in some cases, two or more PCBs mounted together. The electronic components of the PCB may, for example, include ICs, such as microprocessors, memory chips, field programmable gate arrays (FPGAs), and so forth. The electronic components of the PCB may also include lumped elements, such as resistors, capacitors, inductors, and so forth. The electronic components of the PCB may also include opto-electronic components, such as semiconductor lasers or light emitting diodes (LEDs) and may further be mounted on a PCB with lenses or mirrors.

Sensors 102 may comprise one or more sensors and additional hardware (e.g., a radiation source) necessary to enable each modality. The modalities of inspection may include, but are not limited to, VIS, THz spectroscopy, LWIR, SWIR, LP, EMI near field probing, and/or MMW imaging. Example embodiments of a system and method consistent with the present disclosure may employ the modalities shown in Table I below to capture the referenced information.

TABLE I

| Modality | Abbrev. | Wavelength (μm) | Unique Info. Captured |
|---|---|---|---|
| Ultraviolet A | UV | 0.40-0.45 | fluorescent materials |
| Visible | VIS | 0.45-0.75 | human visible color |
| Near Infrared | NIR | 0.75-0.85 | polymer materials |
| Shortwave Infrared | SWIR | 1.50-1.60 | under stickers and labels |
| Longwave Infrared | LWIR | 8.00-14.0 | metal materials |
| Profile | 3D | N/A | height and shape |

One example of a MIS useful in connection with the present disclosure is described in US Patent Publication No. US2022/0020114, the teachings of which are incorporated herein in their entirety.

Figure 3:
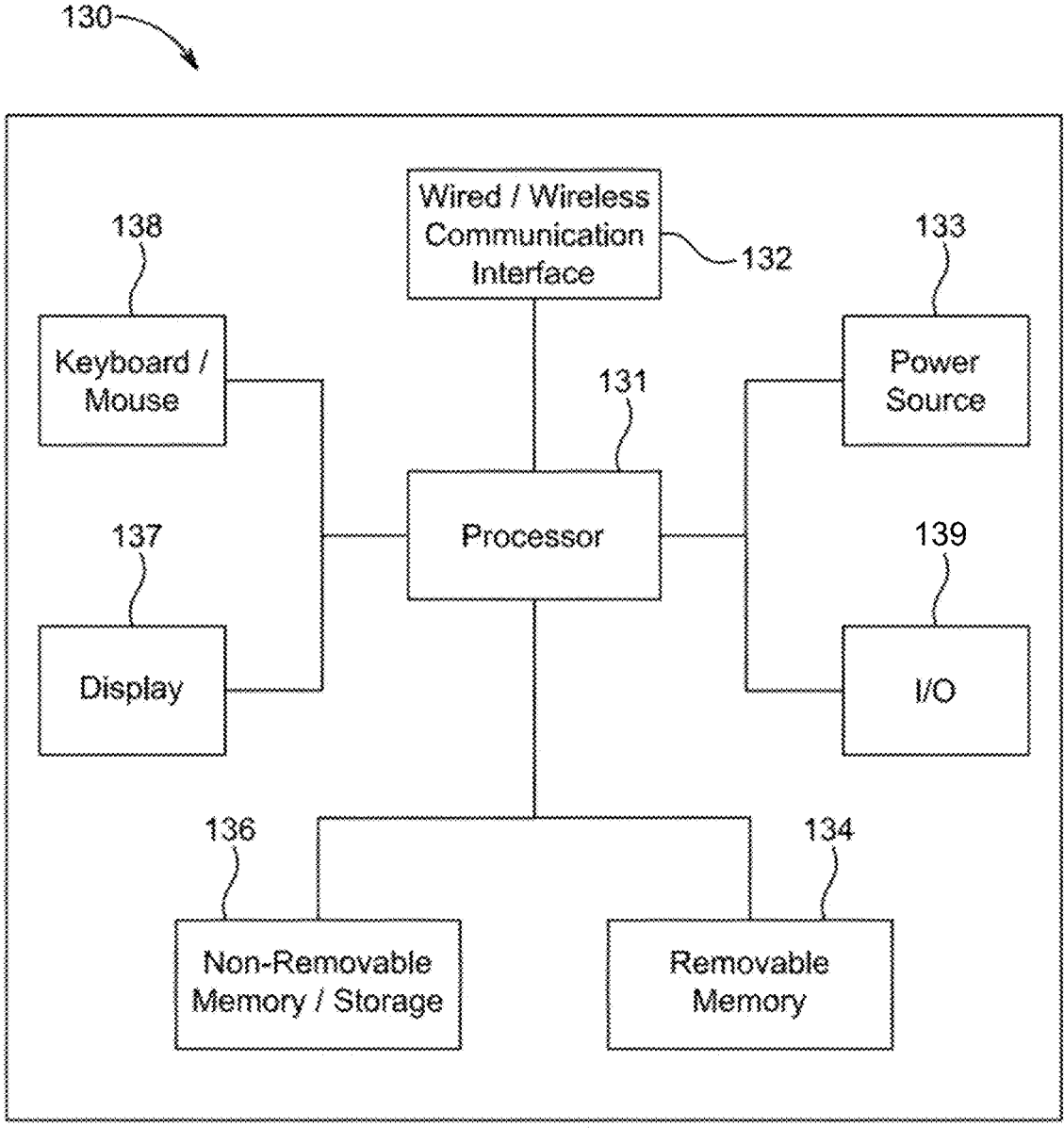
FIG. 3 illustrates an example computing device associated with an MIS consistent with the present disclosure.

Computing device 130 may control MIS 100 and process the data collected via MIS 100 generated as a result of sensors 102. FIG. 3 illustrates an example computing device 130 within MIS 100. Computing device 130 may connected to and/or include a processor 131, a wired or wireless communications interface 132, a power source 133, input and output (I/O) ports 139, removable memory 134, nonremovable memory/storage 136, a display 137, and/or, peripherals for interacting with computing device 130, such as a keypad/mouse/touch screen 138. It will be appreciated that computing device 130 may include any subcombination of the foregoing elements while remaining consistent with embodiments disclosed herein.

Processor 131 may be a special purpose processor, a conventional processor, a digital signal processor (DSP), a plurality of microprocessors, one or more microprocessors in association with a DSP core, a controller, a microcontroller, Application Specific Integrated Circuits (ASICs), FPGAs, any other type of IC, a state machine, and the like. Processor 131 may perform signal coding, data processing, power control, input/output processing, and/or any other functionality that enables computing device 130 to operate in concert with MIS 100. Processor 131 may be coupled to communications interface 132. While FIG. 3 depicts the different elements of computing device 130 as separate components, it will be appreciated that one or more components may be integrated together in an electronic package or chip. Also, one or more of the elements of the computing device may be provided as a remote element accessible via a local area network (LAN) or wide area network (WAN), such as in a cloud computing environment accessible on the Internet.

Communications interface 132 may be configured with an antenna to wirelessly transmit signals to and/or receive signals. In one example, communications interface 132 may be configured with an Ethernet port to conduct wired communication. In other cases, communications interface 132 may utilize other forms of wireless communication, such as IR, UV, or visible light signals, Bluetooth, cellular radio (e.g., 3G, 4G, 5G, etc.), or combinations thereof. In still other cases, communications interface 132 may use any appropriate wired or wireless communication as would be known to a person of skill in the art.

Processor 131 may be coupled to, and may receive user input data from, keyboard/mouse/trackpad 138 and/or display/touchpad 137 (e.g., a liquid crystal display (LCD) display unit or organic light-emitting diode (OLED) display unit). Processor 131 may also output user data to display/touchpad 128. In addition, processor 131 may access information from, and store data in, any type of suitable memory, such as nonremovable memory/storage 136 (e.g., read only memory (ROM), random access memory (RAM), solid-state drive (SSD), Non-Volatile Memory Express (NVMe) SSD, hard drive, etc.), and/or removable memory 134. Removable memory 134 may include a memory stick, a secure digital (SD) memory card, and the like. In other embodiments, processor 131 may access information from, and store data in, memory that is not physically located on computing device 130, such as on a server or a remote storage point (not shown).

Processor 131 may receive power from power source 133 and may be configured to distribute and/or control the power to the other components in computing device 130. Power source 133 may be any suitable source of power, such as one or more batteries, or an electrical outlet appropriate for the region.

As computing device 130 relates to the example MIS 100 of FIG. 1, computing device 130 may be operatively connected to one or sensors 102 via an input/output port 139 (e.g., USB, etc.). Processor 131 may receive and process the data received and store it in the plurality of memory/storage options of computing device 130. In addition to sensors 102, computing device 130 may be operatively connected to other sensors, or other sensors may be internally connected to processor 131.

Any method, or combination of methods, discussed herein may be implemented in a computer program, software, stored program instructions, or firmware, incorporated in a non-transitory computer-readable storage media for execution by a computer or processor, e.g., processor 131. Examples of computer-readable storage media include, but are not limited to, a ROM, a RAM, a register, cache memory, semiconductor memory devices, SSDs, magnetic media such as internal hard disks and removable disks, magneto-optical media, and optical media such as CD-ROM disks, and digital versatile disks (DVDs).

In at least some embodiments, a system and method consistent with the present disclosure use artificial intelligence, such as machine learning, which may include neural networks. For example, some embodiments may implement a trained component or trained model configured to perform the processes described herein. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As it relates to FIG. 3, to provide for the operation of MIS 100, processor 131 may control sensors 102 and translation table 103 to acquire multimodal image data of sample 105; and to perform various data processing and analysis on the multimodal data as disclosed herein. Typically, display 137 may be integrated with or operatively connected with processor 131 to display the images and/or reports as a result of the aforementioned operations performed by processor 131 for inspection of sample 105.

Figure 4:
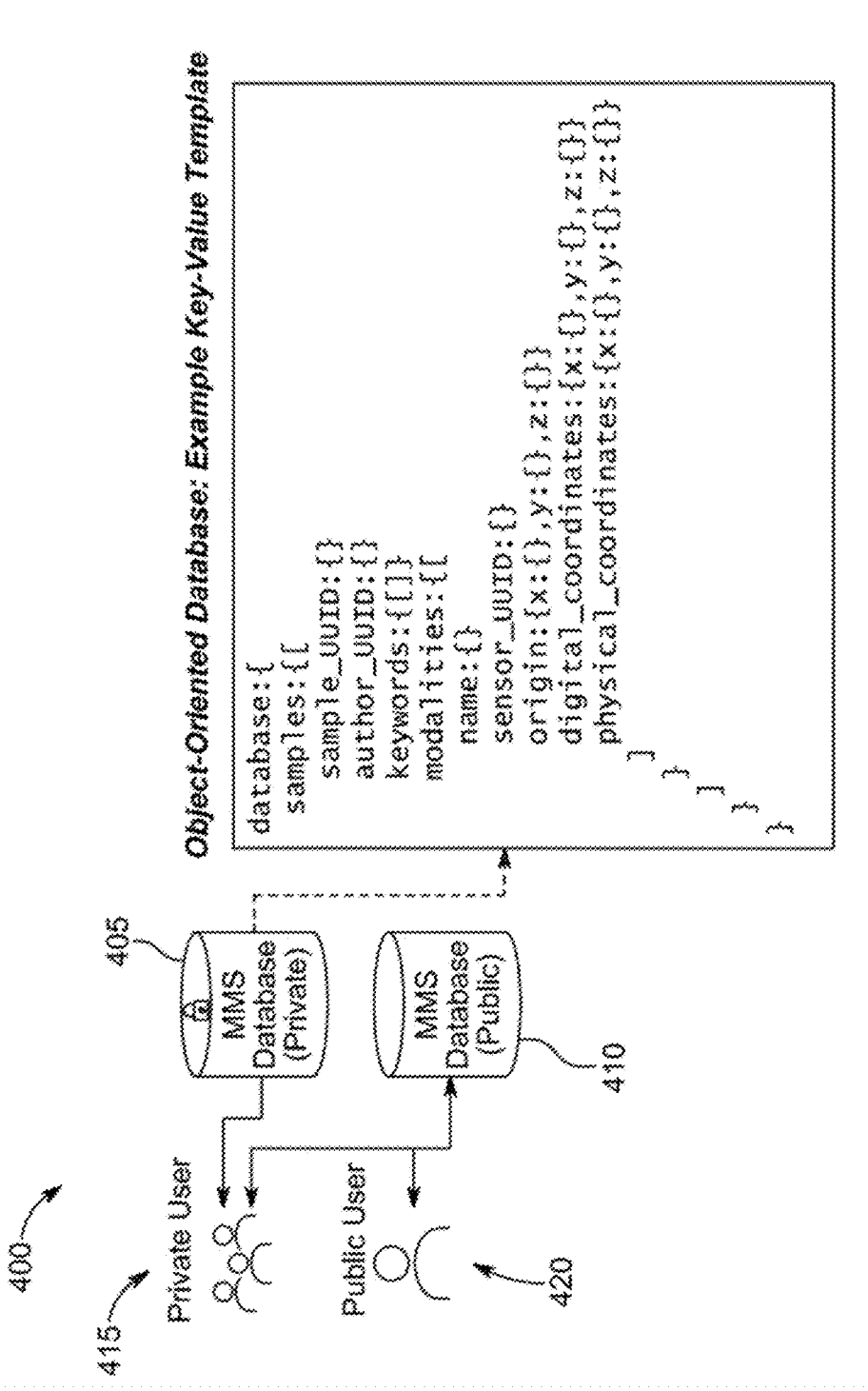
FIG. 4 illustrates a database that may be within an MIS consistent with the present disclosure.

FIG. 4 illustrates a database 400 that may be within computing device 130. Database 400 may be within nonremovable memory/storage 136, for example. Database 400 may include entries of physical object multimodal signatures. The signatures may include two-dimensional and three-dimensional images along with any associated metadata. These images enable reconstruction of an object through spatial correlation of one or more modalities. A single entry in database 400 may include a universally unique identifier (UUID) for the sample, an author UUID, keywords for natural language searchable functionality, and image modality data. Within a sample entry, an individual modality may include the modality name, a sensor UUID, the relative origin of the physical coordinate system in physical units, and digital-physical coordinate pairs to enable homographic transformation of the modality with others. Database 400 may be an object-oriented database with public 410 and private 405 entries. Users, both public 420 and private 415, may access database 400 through a search engine and browser on a web or desktop software client. Authorized users may contribute and download multimodal signatures at the appropriate level of access.

For computer vision and machine learning, a shift may occur toward problem solving in multimodal space going beyond the single modality, namely visible imagery space. Large sets of multimodal images may be created and shared using database 400 enabling research and advancement of the field. A standard format for the multimodal signature (MMS) may be used. Database 400 may host the MMSs with additional metadata to support accessibility of users. The standardized format ensures a lossless transition of data between data acquisition system allowing laboratories and users to share multimodal signatures without the need to align the data each time and without the need to have special instructions for accessing and combining multiple signatures in an optimized way.

In a system consistent with the present disclosure, netlist branches can be determined by the processor 131 from the copper traces identified in MIS imagery of the board in a one- or two-layer PCB and extracted using statistical segmentation methods. Likewise, component mounting point extraction can be determined by locating the solder joints on the board. Therefore, discovery can be treated as a segmentation problem. Statistical methods are bound to have segmentation errors, the most harmful of which are connections that bleed from one connection to another and underconnected links, which will ultimately create an incorrect netlist.

Figures 5A, 5B, 5C:
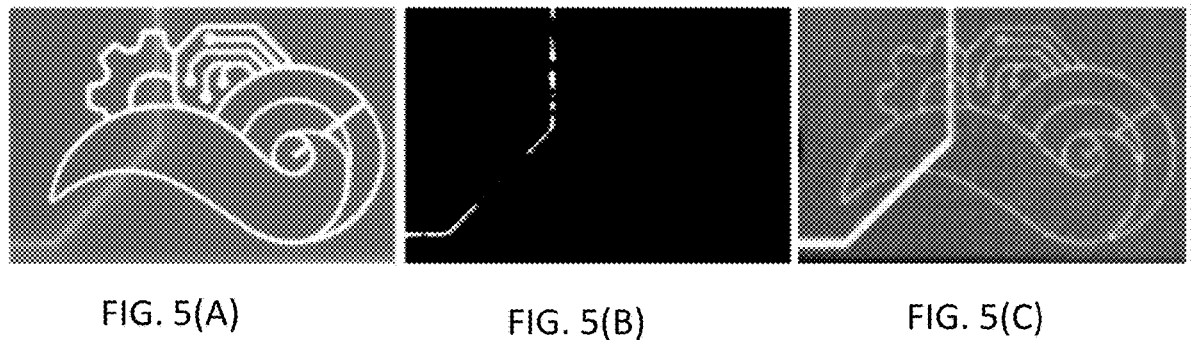
FIGS. 5A-5C illustrate detection of a trace on a printed circuit board that is occluded by a logo on the circuit board.

One source of segmentation errors are occlusions, caused by components or silkscreen prints. FIG. 5A, for example, illustrates a silk screen logo visible on a PCB occluding upper portions of a copper trace. Examining the board from a different wavelength, particularly SWIR, can alleviate, but not remove, this issue by increasing the contrast between the copper and the obstructions, as shown in FIG. 5B. A composite prediction of the trace location beneath the logo is shown in FIG. 5C. This challenge is not present in X-ray tomography since the silkscreen does not appear in X-ray images. Therefore, segmentation may be configured to detect and differentiate silkscreen text from necessary components of the PCB. Since each spectrum provides new information, a system and method consistent with the present disclosure may use multiple modalities of the MIS to correctly segment integrated circuits, mounting points, and copper traces from the board material.

Figure 6:
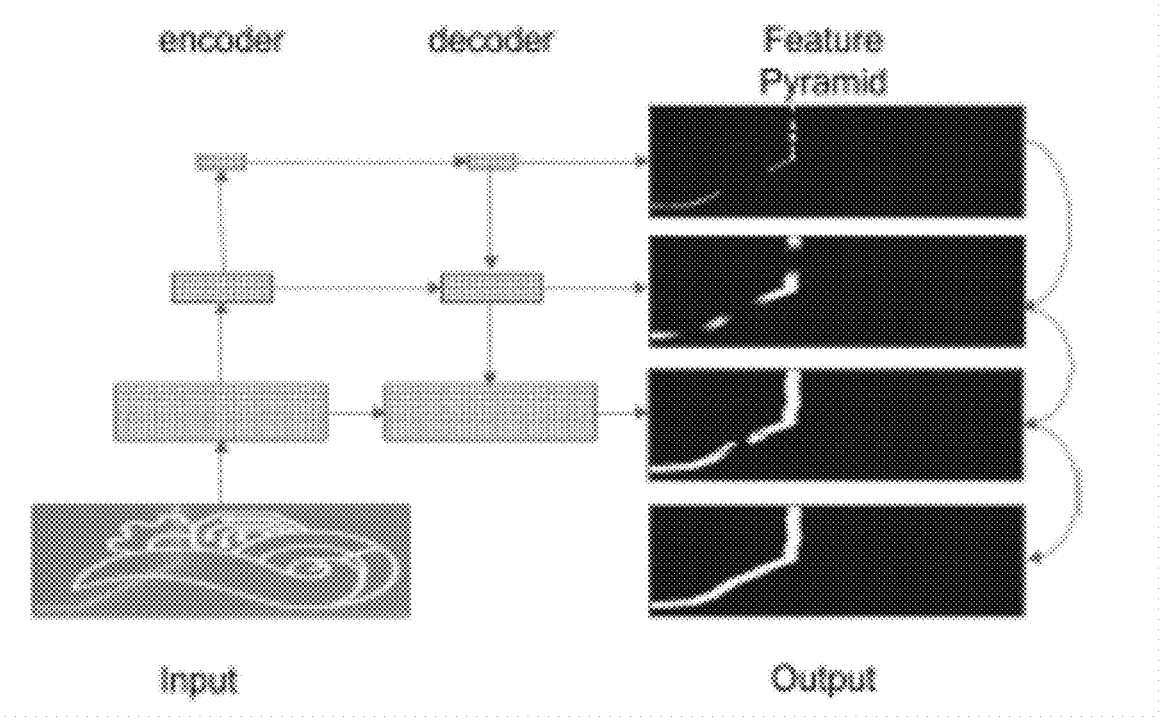
FIG. 6 illustrates operation of a feature pyramid network consistent with the present disclosure.

In a system and method consistent with the present disclosure the information captured from each image modality may be fused to create a comprehensive segmentation mask. In some embodiments, a Feature Pyramid Network (FPN) may be used to fuse each image modality to create the segmentation mask. Traditional segmentation architectures predict the segmentation on the last layer of the network. An FPN is an encoder-decoder neural network where every group of deconvolutional layers in the decoder are used in the prediction, computing segmentation maps at multiple scales that can be concatenated together. This is illustrated in FIG. 6 using the example shown in FIG. 5A as in input. FIG. 6 illustrates the removal of the last layer, and all layers in the decoder are scaled to the end layer and concatenated together to form the segmentation map with every group in the decoder being scaled to the size of the final segmentation map output.

Although other methods of creating a comprehensive segmentation mask may be used in a system consistent with the present disclosure, FPN provides significant advantages given the varying scales and shapes of copper traces. As the percent of copper that exists on a board varies greatly depending on its purpose and manufacturing, the size and shape of the trace exists on multiple levels. Likewise, there is a variable number of mounting points on and around an integrated circuit, and the size and shape of an IC varies greatly.

Components, mounting points, and copper traces segmentation may create simple polygons over their physical location. In some embodiments, to capture these polygons, a system consistent with the present disclosure may compute the Intersection over Union (IoU) between the segmentation masks. For each pair of polygons, IoU is calculated by determining the area of intersection between the two polygons, over the total area the two polygons exist in. However, IoU is not differentiable, and so cannot be used during training. A system and method consistent with the present disclosure may use Cross-Entropy loss for training, which operates as a pixel-based loss function. IoU may be used for validation, to tune the hyperparameters of the model.

Figure 7:
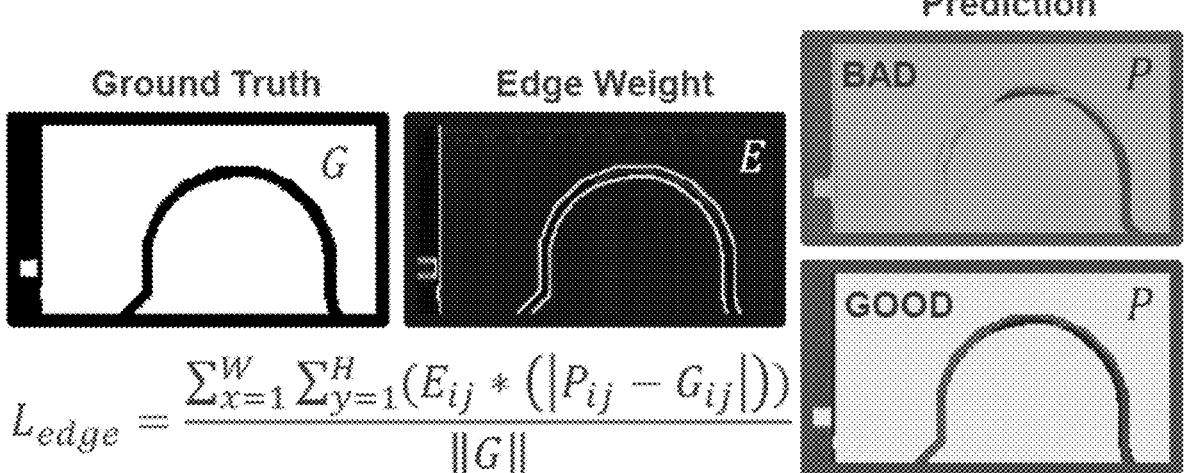
FIG. 7 diagrammatically illustrates operation of a loss function consistent with the present disclosure.

Copper trace extraction may also require that edges maintain their connections. Cross-entropy considers the whole image, and not the inherent super structure of the connections. A system and method consistent with the present disclosure may therefore use an edge-based loss function. Some embodiments, for example, may include calculating the salient edges for each annotated image copper trace, creating a binary edge map of size width and height, and matching the width and height of a segment of the imaged board. In some embodiments, the edge map may be calculated using a Canny edge detector, with the high edge threshold set at double the low edge threshold. The loss between the predicted and annotated image may be calculated from Equation 1 below, and as diagrammatically illustrated in FIG. 7.

$$L = \frac{\sum_{x=1}^{W}\sum_{y=1}^{H}(E_{ij} * (|P_{ij} - G_{ij}|))}{\|G\|} \qquad \text{(Equation 1)}$$

Copper trace extraction may also require that edges maintain their connections. Cross-entropy considers the whole image, and not the inherent super structure of the connections. Another approach may be to use an edge-based loss function. One issue with the edge-based loss function is the lack of salient information over the whole image, causing the gradient to vanish during training. This issue could be addressed in a pixel-based loss function. Cross entropy (CE) loss function is known to perform better on binary segmentation tasks than a pixel loss. In a system consistent with the present disclosure, the loss function may function as a linear combination between edge-based loss and CE loss to ensure enough information from the copper traces is retained during training. The weights may be set in a variety of configurations. In some embodiments, however, the weights may be set to 0.7 CE and 0.3 edge-based loss.

COTS products often do not provide the design files necessary to verify the authenticity of the microelectronic assemblies inside them. Design files may include the shapes and locations of copper layers and holes in the host PCB, or the bill of material (BOM), listing the specifications and locations of each component on the board. From surface imagery alone, image processing software can determine the size, location, type, orientation, number of pins, and the text labeling if legible. The accuracy of such an automated system depends on the quality of the sample.

In some embodiments, an MIS consistent with the present disclosure extracts the BOM from a PCB by first capturing the MMS and applying a convolutional neural network (CNN) to locate and classify each part on the board surface. Then, another CNN is applied to locate text regions, if visible, on the part surface and attempts to extract the characters using optical character recognition (OCR) techniques. Finally, these results may be verified by the human user through the MIS user interface.

Segmenting the electronic components, their mounting point connections, and the copper trace that connects them from the silicon are all important steps to building a correct netlist. In some embodiments, a system and method consistent with the present disclosure demonstrates: multimodal imaging may be advantageously used to extract the PCB elements in the presence of occlusion; the combination of an edge-based loss function with BCE may be advantageously used to ensure boundary learning of the copper traces for convolutional neural networks; and the edge-based loss function is not needed to determine segmentation for integrated circuits and mounting points mounted on a PCB.

Different spectral bands highlight different components of the PCB, and those different components may be used to extract the netlist. Also, FPN can correctly segment copper traces from the PCB by learning the boundaries for the copper traces, and integrated circuits or their mounting points can be modeled using only a cross entropy function.

Figure 8:
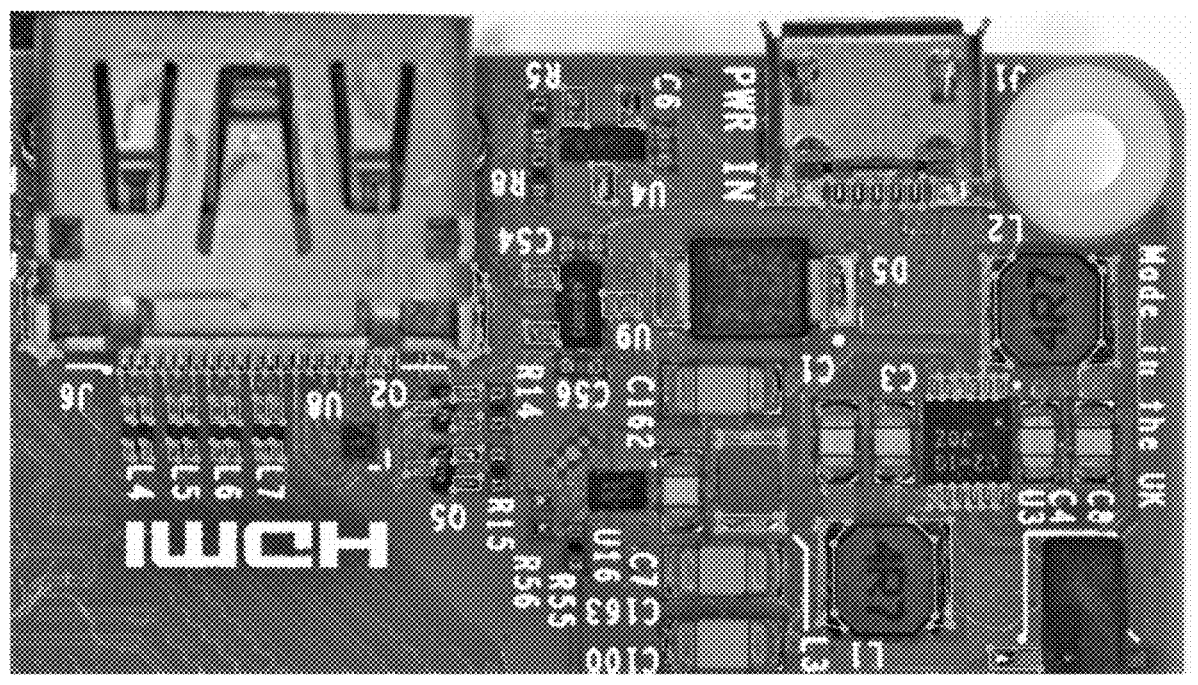
FIG. 8 illustrates encapsulation of features of a PCB in a system consistent with the present disclosure.

Statistical models use a dataset to properly segment or identify the important information, but there are no known publicly available PCB data sets available. As such, a data set was generated to train and test models consistent with the present disclosure using the MIS. In the tests both populated and unpopulated PCBs were imaged, front and back, in five different modalities. As each modality was captured at a different resolution, each modality was scaled to the width and height of the visible (RGB) layer using inter-linear interpolation. Ground truth masks were generated for both part and mounting point extraction. A number of PCBs were labeled using the visible layer; classifying the mounting point as a module, pin, surface, and through hole. The module class contains mounting points that are chips or larger than a surface resistor or capacitor. The mounting point class contains all exposed solder joints or mounting point headers. The surface class contains small chips and surface mounted resistors and capacitors, the through hole class is all the unfilled pin holes. Likewise, five component classes were identified and encapsulated on the PCB: ICs, resistors, capacitors, inductors, and transistor, as shown for example in FIG. 8. While the mounting point and component models are separated, each models learns all the mounting point classes and all the PCB components in a single model.

For copper trace extraction, PCBs that contain components, as well as PCBs without any soldered components were imaged. The ground truth of the copper traces was generated automatically by aligning Gerber files to the visible layer of the boards. Automatic generation requires the exact Gerber revision to be aligned to the boards, creating an overlaid binary segmentation mask. All of the datasets provided were repetitively sparse for supervised learning. Therefore, an augmented dataset was copied and created by performing translations, rotations, scaling, and cropping of the boards on all image modalities.

To determine the efficacy of a system consistent with the present disclosure, results were based on three commonly used segmentation metrics: IoU, Structural Similarity (SSIM), and Boundary Displacement Error (BDE). IoU computes the overlap of the segmentation masks over their total possible area. Likewise, SSIM determines the amount of image distortion between the generated segmentation mask and ground truth. Finally, BDE computes the Euclidean distance from the closest pixel between the edges of the segmentation masks. BDE is normalized using the number of edge pixels in the ground truth image and provides insight into how well the method over segments the traces, as additional edges create a higher error value due to the additional pixels.

In a tested embodiment of the present disclosure, the feature pyramid network was implemented in PyTorch, using ResNet34 as the base encoder pretrained on ImageNet. All training was performed on an Nvidia RTX 2080 graphics processing unit (GPU) with 10 gigabytes of RAM. Training was split using a five-fold cross validation, with ten percent of the dataset being held out purely for testing. Early stopping was implemented using the loss calculated from validation. For experiments using an edge-loss metric, early stopping was calculated using that metric. All other experiments used IoU to select the best trained model.

In order to assess the usefulness of the multimodal imaging approach, an ablation study on each image modality was performed for both tasks. This task was formulated as a one versus all, in that each modality is trained and tested independently, and compared to a model trained using all modalities. The models were judged using IoU for each method. Each network was trained to completion with early stopping and results can be seen in FIG. 9.

Figure 9:
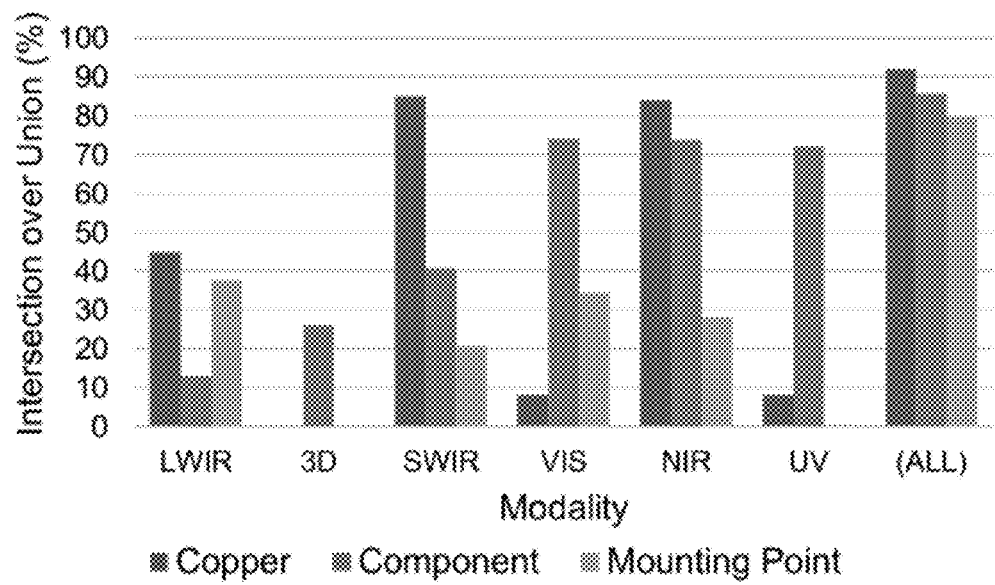
FIG. 9 illustrate test results showing performance of a system and method consistent with the present disclosure.

FIG. 9 shows that the model performs the best when trained using images from all the spectrums. Occlusions occur in all images, although they are low compared to the intensity of the copper traces in spectrums such as the SWIR, hence its higher score. Similarly, the ultraviolet spectrum can identify components due to its ability to fluoresce the component materials. However, one modality by itself does not perform well for all PCB elements. Furthermore, the combination of components allows the model to learn cross modality similarities, boosting the model's efficiency.

In addition, a network was trained using only edge-loss, only BCE, a super-pixel loss, and the disclosed BCE with edge loss function. Networks were trained for 50 epochs, meaning some of the networks were stopped early. This provides a fair comparison between loss functions even though some models may require more learning to adequately discover the domain. Additionally, results were compared to a model that performs thresholding on X-ray board scans. As that is not multispectral, we tested the method using SWIR, which is the modality that provides the best contrast between the copper traces and the board and occlusions. Results are seen in Table II below.

TABLE II

| Model or Method | IoU (higher) | SSIM (higher) | BDE (lower) |
|---|---|---|---|
| Full | 91.6 | 93.6 | $8.6*10^{-5}$ |
| Edge loss only | 91.5 | 31.7 | $3.8*10^{-5}$ |
| Cross Entropy loss only | 91.6 | 99.5 | $1.5*10^{-4}$ |
| X-ray tomography method | 0.19 | 93.6 | $3.3*10^{-4}$ |

Table II shows that both IoU and SSIM are high for the full loss function, while BDE is low. This empirically shows the weights for the loss function. The Full model scores well on all metrics, but not necessarily the best on any one metric. SSIM is based on the mean and average pixel values between the two images, and therefore distorted segmentation components produced by the image will score low on this metric. As the edge loss function focuses the model on the edges, copper traces contained in those edges have a low score. IoU captures translational variations, ensuring the traces are close to where they should be. For copper trace extraction, boards can contain thin threads, which if missing, does not have a large effect on the overall similarity. Capturing the perimeter using BDE ensure those thin threads are found by the model. The cross entropy-only model has an order of magnitude higher BDE score than the full model, showing that it does not capture the perimeter as well. Only the full model captures the copper trace within a segment, ensures close translational correctness, and learns to identify the perimeter.

Table II also shows the X-ray tomography method fails for the dataset. This is expected, as the method was designed for X-ray tomography, which is known to fluoresce copper on the board while not capturing occlusions such as the silkscreen prints on the board. It is difficult to accurately extract the copper traces from a single spectrum in the dataset.

The different loss functions were also compared for extracting mounting points and parts from the board. Similar to the copper extraction method, the effect different loss functions have on segmentation performance was determined. A network was trained using only edge-loss, only cross entropy, and a combination of both edge-loss and cross entropy. Results are seen in Table III and Table IV below.

TABLE III

| Model or Method | IoU | SSIM | BDE |
|---|---|---|---|
| Full | 72.5 | 95.6 | $1.8*10^{-3}$ |
| Cross Entropy only | 72.7 | 99.7 | $1.1*10^{-3}$ |
| Edge loss Only | 43.0 | 96.7 | $4.1*10^{-3}$ |

TABLE IV

| Model or Method | IoU | SSIM | BDE |
|---|---|---|---|
| Full | 17.6 | 64 | $4.5*10^{-2}$ |
| Cross Entropy only | 17.6 | 65.8 | $1.5*10^{-2}$ |
| Edge loss Only | 11.9 | 81 | $5.4*10^{-2}$ |

Table III and Table IV show the testing scores for mounting point and part segmentation, respectively. In both cases, for all testing metrics, the cross entropy only model performed best, while adding the edge loss component did not provide any improvement for mounting point or part segmentation.

Figure 10:
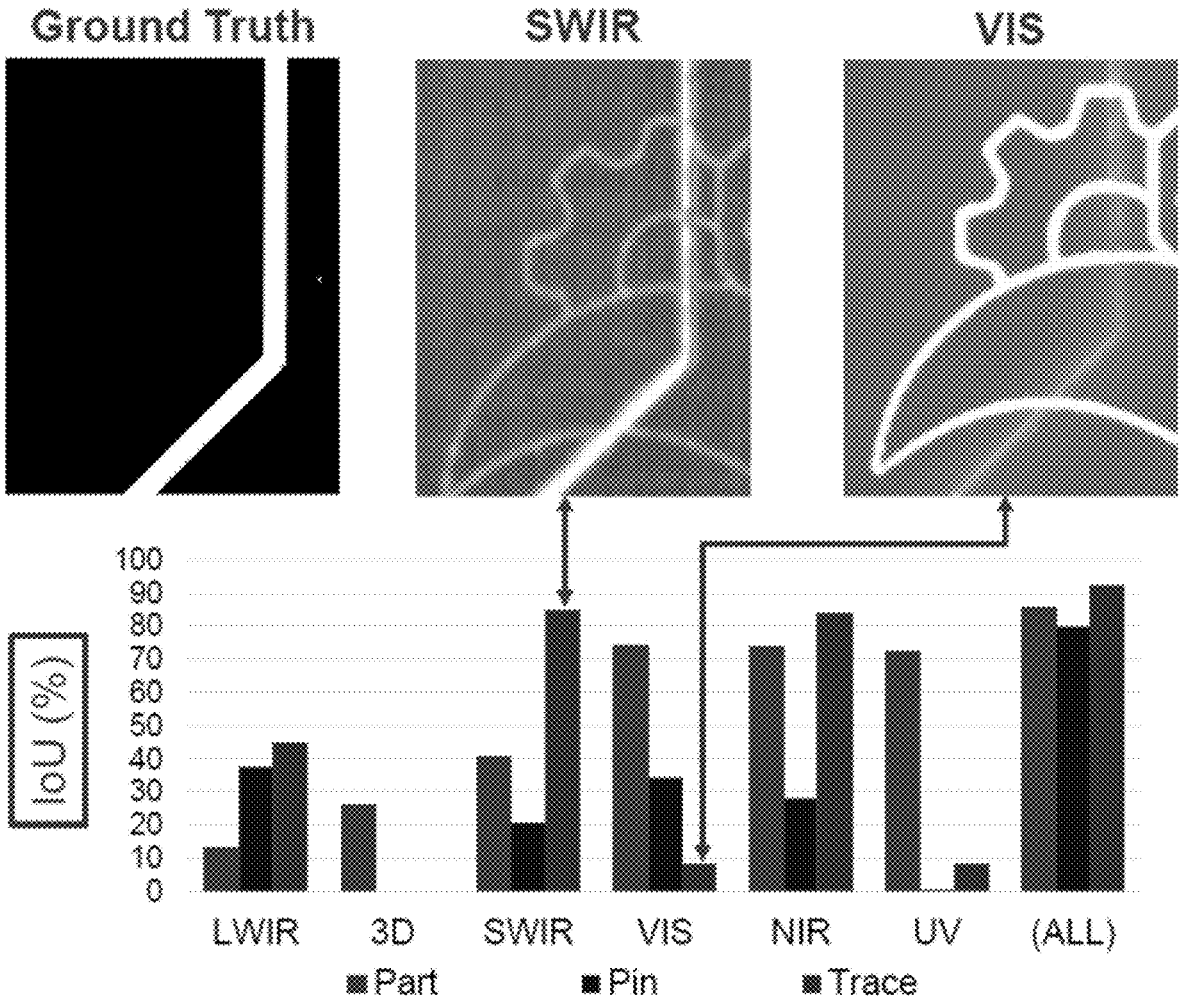
FIGS. 10-12 illustrate test results showing performance of a system and method consistent with the present disclosure.
Figure 11:
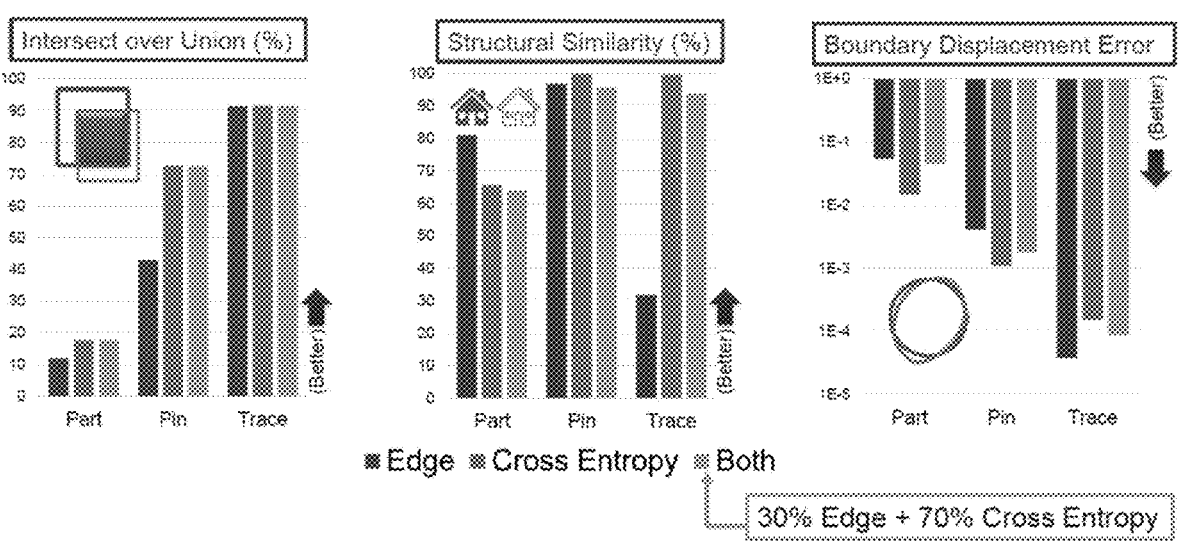
Figure 12:
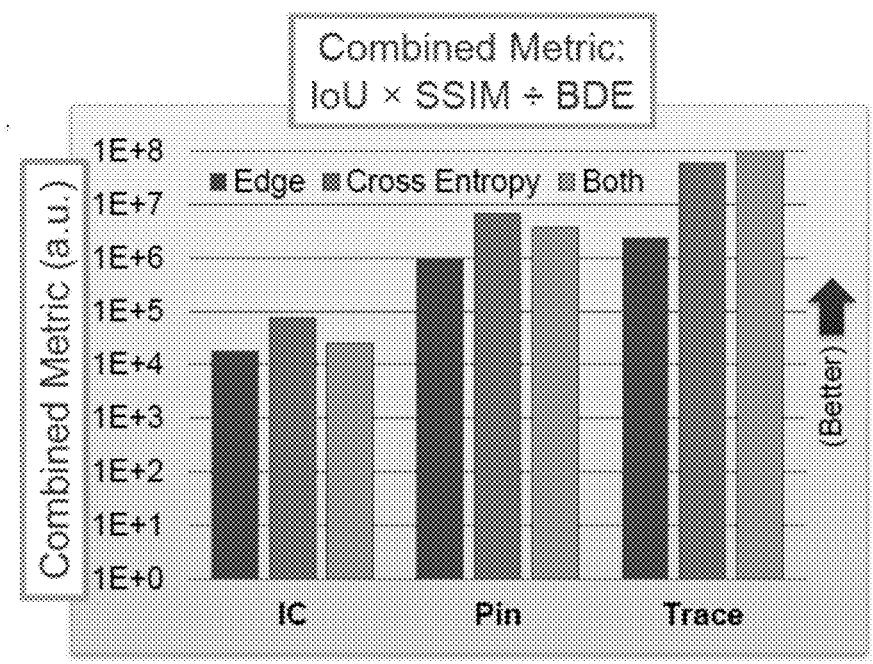

FIG. 10 illustrates test results showing that multimodal imaging is advantageous to extract copper traces in the presence of occlusion. FIGS. 11 and 12 illustrate test results showing a combination of edge-based loss function with cross entropy is advantageous for learning trace boundaries and edge-based loss function is not required for segmentation of ICs and pins.

Figure 13:
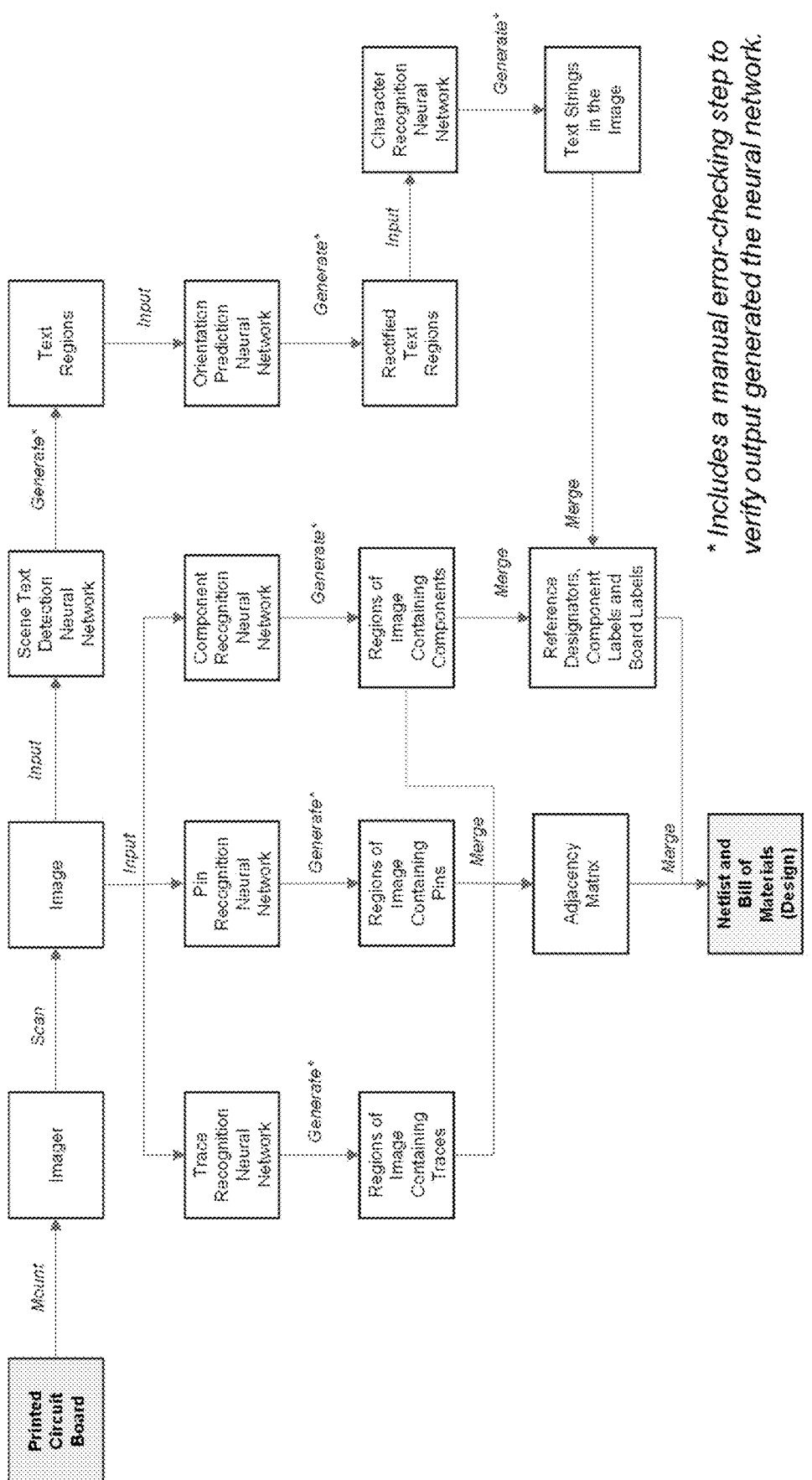
FIG. 13 is a flow diagram illustrating the process flow for one example of a system and method consistent with the present disclosure.

FIG. 13 is a flow chart illustrating steps in one example embodiment of system and method to extract the design (netlist and BOM) of a PCB consistent with the present disclosure. The illustrated flow diagram may be shown and described as including a particular sequence of steps. The illustrated sequence of steps merely provides an example of how the general functionality described herein can be implemented. The steps do not have to be executed in the order presented unless otherwise indicated. In addition, it is to be understood that other embodiments consistent with the present disclosure may include subcombinations of the illustrated steps and/or additional steps described herein. Thus, claims presented herein may be directed to all or part of the components and/or operations depicted in one or more figures.

In the example shown in FIG. 13, a PCB is mounted to an imaging tool and scanned to generate imagery, e.g., using the MIS. The imagery output becomes the input for multiple neural networks, i.e., pin recognition, trace recognition and component recognition neural networks, which determine regions of the image that contain traces, pins, components, and text. Traces, pins and component information is merged to form an adjacency matrix. Text regions are read using an additional character recognition neural network, which generates text strings. The location of the text regions relative to component regions allows the text regions to be categorized as reference designators, component labels or board labels. Finally, the text information is merged with the adjacency matrix to form the PCB design.

The choice of metric has an effect on understanding performance. IoU is useful to determine the overlap between regular polygons that are affected by translational errors. Translational errors have an effect on mounting point detection, as a misplaced mounting point will incorrectly connect two integrated circuits. Likewise, mounting points may be difficult to match to the IC if the IC is incorrectly translated. Copper traces are irregular polygons, where translational effects only matter near the mounting points, and between boundaries of the trace. Furthermore, it is possible for copper traces to be thin irregular polygons, and maintaining the perimeter is more important than capturing the area. While there are standard metrics for image segmentation, different segmentation behaviors warrant different metrics to gauge their success.

According to one aspect of the disclosure, there is provided a method, the method including: capturing image data of a circuit board from a plurality of sensors to generate a set of captured data for each of the plurality of sensors; extracting a plurality of features from the image data using machine learning; and generating a design associated with the circuit board from the plurality of features.

According to another aspect of the disclosure, there is provided a system. The system includes a plurality of sensors configured to capture image data of a circuit board to generate a set of captured data for each of the plurality of sensors; and a processor. The processor is configured to: extract a plurality of features from the image data of the circuit board using machine learning; and generate a design associated with the circuit board from the plurality of features.

According to yet another aspect of the disclosure, there is provided a system. The system includes a processor; a non-transitory computer-readable storage media; and program instructions stored on the non-transitory computer-readable storage media for execution by the processor. The stored program instructions include instructions to: capture image data of a circuit board from a plurality of sensors to generate a set of captured data for each of the plurality of sensors; extract a plurality of features from the image data using machine learning; and generate a design associated with the circuit board from the plurality of features.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, DSP hardware, network processor, ASIC, FPGA, ROM for storing software, RAM, and non-volatile storage. Other hardware, conventional and/or custom, may also be included.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A method comprising: capturing image data of a circuit board from a plurality of sensors to generate a set of captured data for each of the plurality of sensors; extracting a plurality of features from the image data using machine learning; wherein: the plurality of features include at least one of traces, pins, components, and/or text; the text is extracted using optical character recognition; the pins are extracted using a pin recognition neural network; the components are extracted using a component recognition neural network; and the traces are extracted using a Canny edge detector and a loss function, the loss function including a linear combination between an edge-based loss and a cross entropy loss, wherein the cross entropy loss operates as a pixel-based loss function; and generating a design associated with the circuit board from the plurality of features.

2. The method of claim 1, wherein capturing the image data of the circuit board from the plurality of sensors to generate the set of captured data for each of the plurality of sensors further comprises:

capturing a multimodal image data of the circuit board, wherein the plurality of sensors configured to acquire a plurality of electromagnetic wavelengths.

3. The method of claim 1, wherein extracting the plurality of features from the image data using the machine learning further comprises:

fusing the plurality of features from each of the plurality of sensors to create a plurality of segmentation masks, wherein the plurality of features are combined using a feature pyramid network.

4. The method of claim 3, wherein the feature pyramid network is an encoder-decoder neural network.

5. The method of claim 4, wherein:

every group of deconvolutional layers in the encoder-decoder neural network are used in a prediction; and segmentation maps are computed at multiple scales that are concatenated together.

6. The method of claim 3, wherein extracting the plurality of features from the image data using the machine learning further comprises:

capturing a plurality of polygons; and computing an Intersection over Union between a segmentation mask for each pair of the plurality of polygons.

7. The method of claim 1, wherein generating the design associated with the circuit board from the plurality of features further comprises:

generating an adjacency matrix from the plurality of features;

generating text regions from the plurality of features using a character recognition neural network; and combining the adjacency matrix with the plurality of features to generate the design.

8. A system comprising: a plurality of sensors configured to capture image data of a circuit board to generate a set of captured data for each of the plurality of sensors; and a processor configured to: extract a plurality of features from the image data of the circuit board using machine learning; wherein: the plurality of features include at least one of traces, pins, components, and/or text; the text is extracted using optical character recognition; the pins are extracted using a pin recognition neural network; the components are extracted using a component recognition neural network; and the traces are extracted using a Canny edge detector and a loss function, the loss function including a linear combination between an edge-based loss and a cross entropy loss, wherein the cross entropy loss operates as a pixel-based loss function; and generate a design associated with the circuit board from the plurality of features.

9. The system of claim 8, wherein capture the image data of the circuit board from the plurality of sensors to generate the set of captured data for each of the plurality of sensors further comprises:

capture a multimodal image data of the circuit board, wherein the plurality of sensors configured to acquire a plurality of electromagnetic wavelengths.

10. The system of claim 8, wherein extract the plurality of features from the image data using the machine learning further comprises:

fuse the plurality of features from each of the plurality of sensors to create a plurality of segmentation masks, wherein the plurality of features are combined using a feature pyramid network.

11. The system of claim 10, wherein the feature pyramid network is an encoder-decoder neural network.

12. The system of claim 11, wherein:

every group of deconvolutional layers in the encoder-decoder neural network are used in a prediction; and segmentation maps are computed at multiple scales that are concatenated together.

13. The system of claim 10, wherein extract the plurality of features from the image data using the machine learning further comprises:

capture a plurality of polygons; and compute an Intersection over Union between a segmentation mask for each pair of the plurality of polygons.

14. The system of claim 10, wherein generate the design associated with the circuit board from the plurality of features further comprises:

generate an adjacency matrix from the plurality of features;

generate text regions from the plurality of features using a character recognition neural network; and combine the adjacency matrix with the plurality of features to generate the design.

15. A system comprising: a processor; a non-transitory computer-readable storage media; and program instructions stored on the non-transitory computer-readable storage media for execution by the processor, the stored program instructions including instructions to: capture image data of a circuit board from a plurality of sensors to generate a set of captured data for each of the plurality of sensors; extract a plurality of features from the image data using machine learning; wherein: the plurality of features include at least one of traces, pins, components, and/or text; the text is extracted using optical character recognition; the pins are extracted using a pin recognition neural network; the components are extracted using a component recognition neural network; and the traces are extracted using a Canny edge detector and a loss function, the loss function including a linear combination between an edge-based loss and a cross entropy loss, wherein the cross entropy loss operates as a pixel-based loss function; and generate a design associated with the circuit board from the plurality of features.

16. The system of claim 15, wherein capture the image data of the circuit board from the plurality of sensors to generate the set of captured data for each of the plurality of sensors further comprises one or more of the following program instructions, stored on the non-transitory computer-readable storage media, to:

capture a multimodal image data of the circuit board, wherein the plurality of sensors configured to acquire a plurality of electromagnetic wavelengths.

17. The system of claim 15, wherein extracting the plurality of features from the image data using the machine learning further comprises one or more of the following program instructions, stored on the non-transitory computer-readable storage media, to:

fuse the plurality of features from each of the plurality of sensors to create a plurality of segmentation masks, wherein the plurality of features are combined using a feature pyramid network.

18. The system of claim 17, wherein extracting the plurality of features from the image data using the machine learning further comprises one or more of the following program instructions, stored on the non-transitory computer-readable storage media, to:

capture a plurality of polygons; and compute an Intersection over Union between a segmentation mask for each pair of the plurality of polygons.

* * * * *